US010228926B2

(12) United States Patent
Soini et al.

(10) Patent No.: US 10,228,926 B2
(45) Date of Patent: Mar. 12, 2019

(54) REMOTE SUPPORT INSTALLATION MECHANISM

(71) Applicant: T-Mobile USA, Inc., Bellevue, WA (US)

(72) Inventors: Jonathan Michael Soini, Seattle, WA (US); Timothy Adam Shelton, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 36 days.

(21) Appl. No.: 15/009,762

(22) Filed: Jan. 28, 2016

(65) Prior Publication Data

US 2017/0220330 A1 Aug. 3, 2017

(51) Int. Cl.
*G06F 8/61* (2018.01)
*H04L 29/06* (2006.01)

(52) U.S. Cl.
CPC ............ *G06F 8/61* (2013.01); *H04L 63/0428* (2013.01); *H04L 63/0876* (2013.01); *H04L 63/102* (2013.01); *H04L 67/42* (2013.01)

(58) Field of Classification Search
USPC ......................................................... 713/191
See application file for complete search history.

(56) References Cited

U.S. PATENT DOCUMENTS

| | | | | |
|---|---|---|---|---|
| 5,706,349 A | * | 1/1998 | Aditham | G06F 21/33 713/159 |
| 6,014,612 A | * | 1/2000 | Larson | G06F 11/22 700/11 |
| 6,792,548 B2 | * | 9/2004 | Colvin | G06F 21/121 705/51 |
| 8,359,016 B2 | * | 1/2013 | Lindeman | H04L 67/34 455/414.1 |
| 8,510,476 B2 | * | 8/2013 | Eastvold | H01L 22/20 702/184 |
| 8,850,598 B2 | * | 9/2014 | Pelley | G06Q 10/063 709/201 |
| 9,319,406 B2 | * | 4/2016 | Pardehpoosh | H04L 63/0876 |
| 9,369,299 B2 | * | 6/2016 | Dupont | H04L 12/2872 |

(Continued)

FOREIGN PATENT DOCUMENTS

| | | | | |
|---|---|---|---|---|
| JP | 2016039633 A | * | 3/2016 | ............. H04N 7/147 |
| JP | 2016039633 A | * | 3/2016 | ............. H04N 7/147 |

*Primary Examiner* — Taghi T Arani
*Assistant Examiner* — Badri Champakesan
(74) *Attorney, Agent, or Firm* — Han Santos, PLLC

(57) ABSTRACT

A remote support installation mechanism provides for the installation of a remote support client application onto a user device. A server may receive a request for a remote support eligibility status from a device agent application on a user device that is loaded with an installer package for a remote support client application. The remote support client application may be used to initiate a remote support session with a remote support application on a remote support server to provide a computing terminal with remote support access to the user device. The server may determine based on at least one of a device management database or a user account database that the user device qualifies for remote support. Accordingly, the server may send an install command to trigger an installation of the remote support client application on the user device from the installer package.

21 Claims, 8 Drawing Sheets

(56) References Cited

U.S. PATENT DOCUMENTS

| | | | |
|---|---|---|---|
| 2003/0088633 A1* | 5/2003 | Chiu | H04L 29/06 709/206 |
| 2004/0088576 A1* | 5/2004 | Foster | G06F 21/33 726/10 |
| 2006/0070077 A1* | 3/2006 | Erlandson | G06F 11/0748 718/104 |
| 2007/0288254 A1* | 12/2007 | Eisner | G06Q 10/0637 358/1.11 |
| 2007/0294368 A1* | 12/2007 | Bomgaars | H04L 41/22 709/217 |
| 2008/0244566 A1* | 10/2008 | Fukaya | G06F 9/4411 717/176 |
| 2009/0052675 A1* | 2/2009 | Levow | G06F 21/33 380/278 |
| 2009/0149158 A1* | 6/2009 | Goldfarb | H04L 65/4061 455/414.1 |
| 2010/0222939 A1* | 9/2010 | Namburu | G07C 9/00111 701/2 |
| 2010/0257596 A1* | 10/2010 | Ngo | G06F 21/6218 726/7 |
| 2013/0067552 A1* | 3/2013 | Hawkes | H04L 63/166 726/7 |
| 2013/0085880 A1* | 4/2013 | Roth | G06F 21/602 705/26.1 |
| 2013/0303118 A1* | 11/2013 | Asandului | H04W 12/12 455/410 |
| 2014/0025770 A1* | 1/2014 | Warfield | G06F 15/17331 709/213 |
| 2014/0096208 A1* | 4/2014 | Buck | G06F 17/30165 726/5 |
| 2014/0115487 A1* | 4/2014 | Sandler | H04M 1/7253 715/740 |
| 2014/0143851 A1* | 5/2014 | Baum | G08B 25/008 726/12 |
| 2014/0156992 A1* | 6/2014 | Medin | H04L 63/123 713/168 |
| 2014/0223528 A1* | 8/2014 | Slutsker | H04L 63/08 726/6 |
| 2014/0289864 A1* | 9/2014 | Dimitrakos | G06F 21/53 726/26 |
| 2014/0304129 A1* | 10/2014 | Colosso | G06Q 30/0645 705/35 |
| 2014/0310522 A1* | 10/2014 | Bomgaars | H04L 12/6418 713/168 |
| 2015/0106616 A1* | 4/2015 | Nix | H04W 4/70 713/156 |
| 2015/0156270 A1* | 6/2015 | Teraoka | G06F 13/00 709/219 |
| 2015/0222621 A1* | 8/2015 | Baum | H04W 4/70 726/9 |
| 2015/0253379 A1* | 9/2015 | Lin | G01R 31/2834 702/118 |
| 2016/0098876 A1* | 4/2016 | Oz | G07C 5/008 340/5.61 |
| 2016/0301540 A1* | 10/2016 | Francescangeli | H04L 12/2809 |
| 2016/0381006 A1* | 12/2016 | Rykowski | H04L 63/0823 713/156 |
| 2017/0006020 A1* | 1/2017 | Falodiya | H04L 63/0815 |
| 2017/0140643 A1* | 5/2017 | Puppo | G08C 17/02 |
| 2017/0163609 A1* | 6/2017 | Pentimalli | H04L 63/0435 |
| 2017/0249579 A1* | 8/2017 | Busa | G06Q 10/06 |
| 2017/0264504 A1* | 9/2017 | Jasen | H04L 47/10 |

* cited by examiner

REMOTE SUPPORT INSTALLATION MECHANISM

BACKGROUND

Mobile devices are integral to the daily lives of most users. Mobile devices are used to make voice calls, check email and text messages, update social media pages, stream media, browse websites, and so forth. As a result, users of mobile devices expect a mobile telecommunication carrier to provide constant and reliable telecommunication and data communication services at all times.

The reliability of telecommunication and data communication services may be affected by multiple factors, including device settings of the mobile devices. While some technically savvy users are able to solve communication service issues that affect their mobile devices by modifying the device settings of these mobile devices, other users prefer to contact customer care to resolve such issues. However, a customer service representative may have difficulty diagnosing problems that are affecting a user device via a telephone call, as the user of the device may not be familiar enough with the mobile device to locate and verbally relay the device settings of the device to the customer service representative.

Furthermore, even in instances in which an issue with a user device setting is correctly identified, a user may lack the technical knowledge to modify the device setting according to the verbal instructions provided by the customer service representative. Accordingly, telephone call based customer support may on occasions lead to frustration for both the user and the customer care representative.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
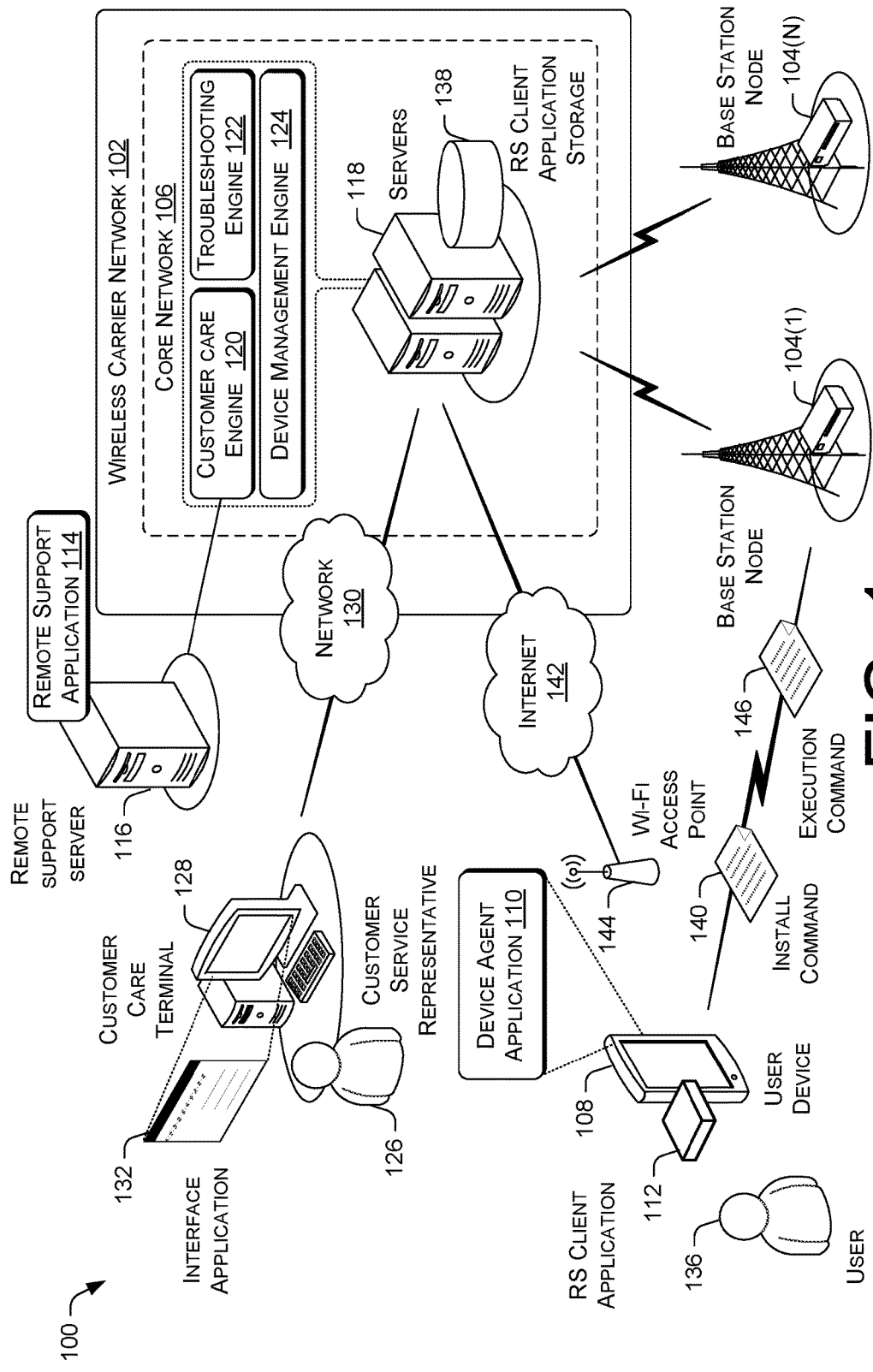
FIG. 1 illustrates an example network architecture for implementing a remote support installation mechanism that installs and executes a remote support client application on a user device.

This disclosure is directed to the implementation of a remote support installation mechanism that installs a remote support client application onto a user device. Once installed on the user device, the remote support client application may enable an authorized user to remotely access the device settings and the device features of the user device using a remote support application that is executing on a remote computing device. The user device may be a mobile device that is used by a customer to access the telecommunication and data communication services that are provided by a mobile telecommunication carrier. Accordingly, the authorized user may be a customer service representative of the mobile telecommunication carrier. The customer service representative may use the remote support client application on the user device to remotely view and/or modify device features and settings of the user device in order to resolve a service issue.

In some embodiments, an installer package for the remote support client application may be preloaded on a user device. Accordingly, the customer service representative may use a device management engine of a wireless carrier network to command a device agent application on the user device to initiate an installation of the remote support client application from the installer package. The customer service representative may initiate the installation upon determining that an issue with the user device is not solvable without remote support. Following a report from the device agent application that the installation is complete, the device management engine may be used to trigger an execution of the remote support client application. Upon execution, the remote support client application may prompt a user for permission to establish a remote support session with the remote support application so that the customer service representative may remotely access the user device.

In alternative embodiments, instead of the installer package being preloaded on the user device, the customer service representative may use the device management engine to command the device agent application on the user device to download the installer package from the wireless carrier network.

In other embodiments, the installation of the remote support client application from a preloaded or downloaded installer package may be automatically triggered without user intervention. For example, the download and/or the installation may be automatically triggered when the wireless carrier network detects that a customer has called a customer care number of the wireless carrier network via the user device, and is selecting an option to talk to a customer care representative about the user device. In another example, the download and/or the installation may be automatically triggered when a troubleshooting engine that is monitoring a device health of the user device determines that the device health is to be resolved via remote intervention. In additional embodiments, the device management engine may further trigger an automatic execution of the installed remote support client application to establish a remote support session.

The remote support installation mechanism provides for the installation of a remote support client application onto a user device in a semi-autonomous or autonomous manner. The remote support installation mechanism may enable a customer service representative to assist a customer in resolving a technical issue with the user device in a more expedient manner. For example, the customer may lack the familiarity or technical expertise to understand the verbal troubleshooting instructions provided by the customer service representative over a customer care call. In such instances, the ability of the customer service representative to use a remote support client application that has been semi-autonomously or autonomously installed onto the user device to provide remote support may greatly reduce issue determination and issue resolution time. Thus, the techniques may reduce customer service support cost and time, as well as increase customer satisfaction and customer retention. The techniques described herein may be implemented in a number of ways. Example implementations are provided below with reference to the following figures.

Example Network Architecture

FIG. 1 illustrates an example network architecture 100 for implementing a remote support installation mechanism that installs and executes a remote support client application on a user device. The architecture 100 may include a wireless carrier network 102. The wireless carrier network 102 may be operated by a wireless communications carrier. The wireless carrier network 102 may include base station nodes 104(1)-104(N) as well as a core network 106. The base stations 104(1)-104(N) are responsible for handling voice and data traffic between user devices, such as a user device 108, and the core network 106. Alternatively, the user device 108 may access the core network 106 via other communication networks of the wireless communication carrier, third-party providers that connect to the core network, or the Internet. The user device 108 may be a smart phone, a feature phone, a tablet computer, or another portable communication device.

In some embodiments, a device agent application 110 may be preinstalled on the user device 108. The device agent application 110 may be responsible for installing a remote support client application 112 onto the user device 108. Alternatively or concurrently, the device agent application 110 may also initiate an execution of the installed remote support client application 112 to communicate with a remote support application 114 on a remote support server 116. In some embodiments, the remote support server 116 may be under the control of the mobile telecommunication carrier operating the wireless carrier network 102. In other embodiments, the remote support server 116 may be operated by a third-party vendor.

The core network 106 may provide telecommunication and data communication services to the user devices. For example, the core network 106 may connect the user device 108 to other telecommunication and data communication networks. In various embodiments, the core network 106 of the wireless carrier network 102 may be equipped with one or more servers 118.

The servers 118 may host a customer care engine 120, a troubleshooting engine 122, and a device management engine 124. The customer care engine 120 may be responsible for managing user device statuses of user devices, user accounts of the customers who are using user devices, and service plans of such customers. A customer service representative 126 at a customer care center may access the customer care engine 120 via a customer care terminal 128. The customer care terminal 128 may be connected to the servers 118 via a network 130. In various embodiments, the customer care terminal 128 may be a laptop computer, a desktop computer, a tablet computer, or any other networked computing device that is processing inputs to generate outputs. The network 130 may be any secured LAN, WAN, or other network that is access controlled through the use of user authentication, data encryption, or access control technologies. For example, the network 130 may be a firewalled Intranet or a Virtual Privacy Network (VPN) that is solely accessible to authorized employees of the wireless carrier network 102. The customer care terminal 128 may execute an interface application 132, such as a thin client application or a web browser, such that the customer service representative 126 may use the monitoring and management functionalities of the customer care engine 120.

The troubleshooting engine 122 may monitor and analyze data from multiple data sources of the wireless carrier network 102 to detect device or communication service issues that negatively impact user devices, such as the user device 108. In various embodiments, the multiple data sources may include a network information database, a device information database, and a user account database. The network information database may include information regarding technical and operational statuses of the wireless carrier network 102. The device information database may include data regarding the technical capabilities, feature setting, and operational statuses of user devices. The user account database may store account details of multiple users, such as account type, billing preferences, service plan subscriptions, payment histories, data consumed, minutes of talk time used, and/or so forth. In various embodiments, the troubleshooting engine 122 may be triggered by the customer service representative 126 to analyze data from the multiple data sources that are relevant to a user device to detect device issues that affect the user device.

The device management engine 124 may coordinate with the device agent application 110 on the user device 108 to download, install, and/or execute the remote support client application 112 on the user device 108. In various embodiments, the device management engine 134 may initiate a download, an installation, or an execution in response to a command from the customer care engine 120. In some instances, the user device 108 as initially delivered to a user 136 from a manufacturer may be preloaded with an installer package for the remote support client application 112. The installer package may include one or more setup files, library files, and/or installation utilities that are able to install the remote support client application 112 onto the user device 108.

Subsequently, the device agent application 110 may periodically check for updated versions of the installer packages from the device management engine 124 via a secure communication session. The updated versions of the installer packages may be stored in the remote support client application storage 138 of the servers 118. In the event that an updated version of the installer package is available, the device agent application 110 may download the updated installer package from the device management engine 124 via the secure communication session. Following the download, the device agent application 110 may replace the current version of the installer package with the updated version of the installer package.

In one scenario, the user 136 of the user device 108 may place a telephone support call with the customer service representative 126 upon experiencing an issue with the user device 108. During the course of the telephone support call, the customer service representative 126 may determine that the issue with the user device 108 is not resolvable without remote access by the representative to the device settings and/or device features of the user device 108. Accordingly, the customer service representative 126 may activate a remote support application install option that is provided by the customer care engine 120. The application install option may be accessed via the interface application 132 on the customer care terminal 128. The installation request is passed by the customer care engine 120 to the device management engine 124, which then sends an install command 140 to the device agent application 110 on the user device 108 via a secure communication. Subsequently, the device agent application 110 may receive and validate the install command 140. Upon proper validation, the device agent application 110 may execute the install command 140 and install the remote support client application 112 from the installer package that is stored on the user device 108.

The device management engine 124 may send the install command 140 to the user device 108 via one or more communication channels. In one instance, the device management engine 124 may send the install command 140 via an application-specific data push through the Internet 142. In such an instance, the device agent application 110 may receive the data push that includes install command 140 through a Wi-Fi connection between the user device 108 and a Wi-Fi access point, such as the Wi-Fi access point 144. In another instance, the device management engine 124 may receive the install command 140 through a Short Messaging Service (SMS) message. In such an instance, the device agent application 110 may intercept the SMS message as delivered to the user device 108 via a cellular connection. The cellular connection may be between a base station node, such as the base station node 104(1), and the user device 108. In some embodiments, the device management engine 124 may send the install command 140 through the multiple communication channels in a simultaneous or near simultaneous manner, which increases the chance that the device agent application 110 is able to receive the install command 140 through at least one of the communication channels.

Once the remote support client application 112 is installed on the user device 108, the device agent application 110 may send an installation completion response to the device management engine 124 via secure communication. The response may be delivered via a Wi-Fi connection or a cellular connection. The device management engine 124 may send the response to the customer care engine 120. In turn, the customer care engine 120 may render a launch remote support option for display on the interface application 132. Accordingly, upon activation of the launch remote-support option, the device management engine 124 may be prompted by the customer care engine 120 to send an execution command 146 to the user device 108 via secure communication. The execution command 146 may trigger the execution of the installed remote support client application 112 to establish a remote support session with the remote support application 114. The remote support session may enable the customer service representative 126 to remotely access the user device 108.

In alternative embodiments, the user device 108 may lack a preloaded installer package for the remote support client application 112. In such embodiments, the customer service representative 126 may initiate the download of an appropriate version of a remote support client application as stored in the remote support client application storage 138 to the user device 108. Once the remote support client application is downloaded, the customer service representative 126 may trigger the installation and execution of the remote support client application on the user device 108 in a similar manner as previously described above.

In other embodiments, the installation of the remote support client application 112 from a preloaded or downloaded installer package may be automatically triggered without user intervention. In some embodiments, the download and/or the installation may be automatically triggered when the customer care engine 120 detects that the user 136 has called a customer care number of the wireless carrier network via the user device 108, and is selecting an option to talk to a customer care representative about the user device 108. For example, the selection of the customer care representative option by the user 136 may be detected by an interactive voice response (IVR) function of the customer care engine 120.

Subsequently, the customer care engine 120 may prompt the device management engine 124 to automatically send the appropriate installer package and/or install command to the user device 108 via secure communication. As such, the customer care representative may further trigger an execution of the remote support client application 112 via an execution command as desired. The executed remote support client application 112 may establish a remote support session with the remote support application 114. The remote support session may enable the customer service representative 126 to remotely access the user device 108. In such embodiments, the device management engine 124 may also be prompted by the customer care engine 120 to automatically send an execution command to the user device 108. In this way, the remote support client application 112 may preemptively establish a remote support session with the remote support application 114 in anticipation that the customer service representative 126 will remotely access the device features and/or device settings of the user device 108. This preemptive establishment of the remote support session may shorten the customer support time used in resolving an issue.

In additional embodiments, the download and/or the installation of the remote support client application 112 may be automatically triggered when the troubleshooting engine 122 determines that the user device 108 is experiencing a device issue that is to be resolved via remote intervention. In such embodiments, the device management engine 124 may also be prompted by the customer care engine 120 to automatically send an execution command to the user device 108. In this way, the remote support client application 112 may establish a remote support session with the remote support application 114. The remote support session may enable the customer service representative 126 to troubleshoot one or more device issues that are noted by the troubleshooting engine through the modification of device features and/or device settings.

Example User Device Components

Figure 2:
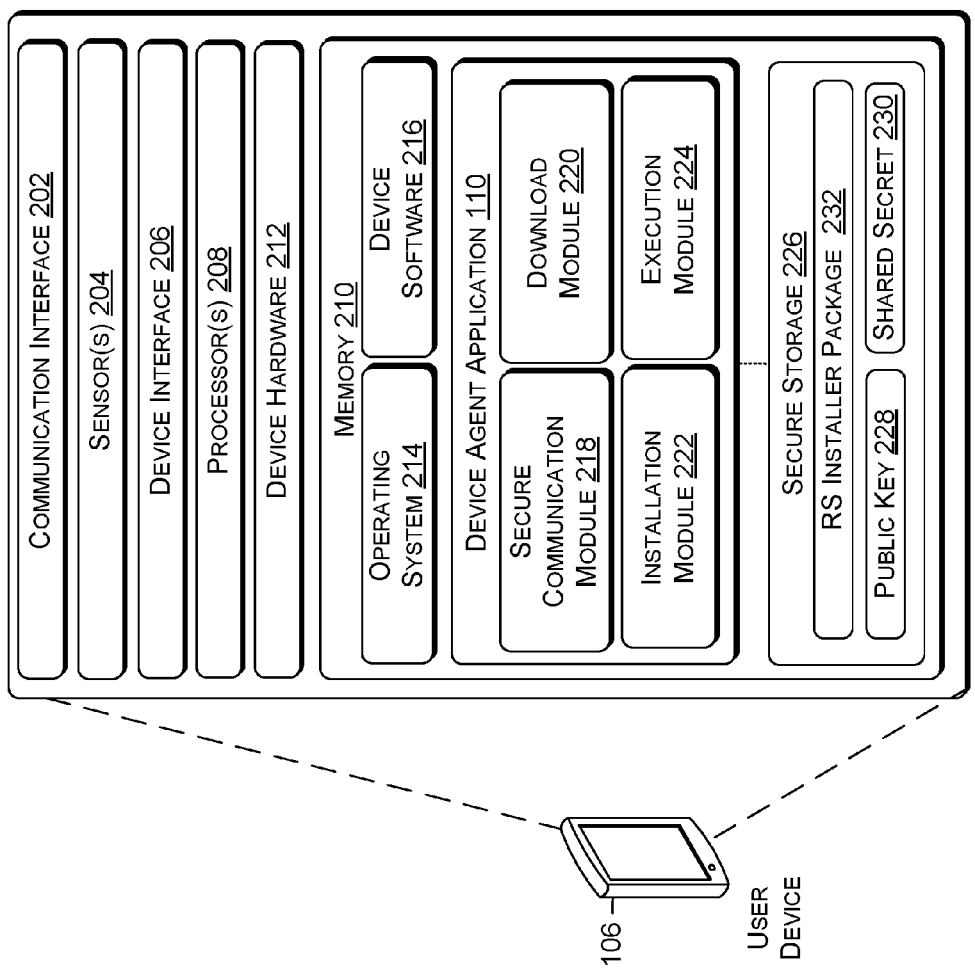
FIG. 2 is a block diagram showing various components of an illustrative user device that installs and executes a remote support client application under the direction of a remote support installation mechanism.

FIG. 2 is a block diagram showing various components of an illustrative user device that installs and executes a remote support client application under the direction of a remote support installation mechanism. The user device 108 may include a communication interface 202, one or more sensors 204, device interface 206, one or more processors 208, memory 210, and device hardware 212.

The communication interface 202 may include wireless and/or wired communication components that enable the electronic device to transmit or receive voice or data communication via the network 106, as well as other telecommunication and/or data communication networks. The sensors 204 may include a proximity sensor, a compass, an accelerometer, and/or a global positioning system (GPS) sensor. The proximity sensor may detect movement of objects that are proximate the user device 108. The compass, the accelerometer, and the GPS sensor may detect orientation, movement, and geolocation of the user device 108.

The device interface 206 may enable a user to provide inputs and receive outputs from the user device 108. The device interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

Each of the processors 208 may be a single-core processor, a multi-core processor, a complex instruction set computing (CISC) processor, or another type of processor. The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The device hardware 212 may hardware that is typically located in a mobile telecommunication device. For example, the device hardware 212 may include signal converters, antennas, hardware decoders and encoders, graphic processors, a SIM card slot, modem, and/or the like that enable the user device 108 to execute applications and provide telecommunication and data communication functions. A SIM card may be inserted into the SIM card slot of the user device 108. The SIM card may contain subscriber identification information and the SIM carrier code. Accordingly, the SIM card may enable the user device to obtain telecommunication and/or data communication services from the wireless carrier network 102. The device hardware 212 may further include an antenna interface controller, a network interface controller, and/or a universal serial bus (USB) controller. The antenna interface controller may be used by the processors 208 to transmit and receive data through radio waves. In various embodiments, the antenna interface controller may support EDGE, W-CDMA, HSPA, LTE, CDMA-2000 network communication modes.

The one or more processors 208 and the memory 210 of the user device 108 may implement an operating system 214, device software 216, and the device agent application 110. Such software may include routines, program instructions, objects, and/or data structures that perform particular tasks or implement particular abstract data types.

The operating system 214 may include components that enable the user device 108 to receive and transmit data via various interfaces (e.g., user controls, communication interface 202, and/or memory input/output devices). The operating system 214 may also process data using the one or more processors 208 to generate outputs based on inputs that are received via the device interface 206. For example, the operating system 214 may provide an execution environment for the execution of the device software 216. The operating system 214 may include a presentation component that presents the output (e.g., display the data on an electronic display, store the data in memory, transmit the data to another electronic device, etc.). Additionally, the operating system 214 may include other components that perform various other functions generally associated with an operating system.

The device software 216 may include software components that enable the user device to perform functions. For example, the device software 216 may include basic input/output system (BIOS), bootrom, or a bootloader that boots up the user device 108 and executes the operating system 214 following power up of the device. The device software 216 may further include applications that provide utility, entertainment, and/or productivity functionalities. For example, the applications may include telephony applications, electronic mail applications, remote desktop applications, web browser applications, navigation applications, office productivity applications, multimedia streaming applications, and/or so forth.

The device agent application 110 may manage the download, installation and/or execution of a remote support client application, such as the remote support client application 112, for the user device 108. The device agent application 110 may include a secure communication module 218, a download module 220, an installation module 222, and an execution module 224. The device agent application 110 may access a secure storage 226. The secure storage 226 may be an isolated memory space of the memory 210 that is accessible solely by the device agent application 110. Accordingly, the isolation of the secure storage 226 may provide a high level of security for the data stored in the memory space.

The secure communication module 218 may provide a secure communication session for communicating with the device management engine 124. In various embodiments, the secure communication module 218 may use transport layer security (TLS) to form the communication session. In at least one implementation, the secure communication module 218 may contact a server 118 for a secure connection. The server 118 may send back a digital certificate that verifies an identity of the server 118. For example, the digital certificate may contain the server name, the trusted certificate authority (CA), and the public key 228 of the server. The public key 228 may be part of a public-private key pair that is used by the servers 118 to perform asymmetric encryption. The public key 228 may be stored in advance in the secure storage 226.

After the secure communication module 218 has validated the digital certificate of the server 118 with the CA, the secure communication module 218 may encrypts a shared secret 230 (e.g., a random number) with the public key. The result of the encryption is then sent to the server 118 for decryption into the shared secret 230 using the private key of the public-private key pair. Subsequently, the shared secret 230 is used by the secure communication module 218 and the server 118 to generate one or more unique session keys for subsequent encryption and decryption of data during the session. Accordingly, communications between secure communication module 218 and the device management engine 124 in a secure communication session may be encrypted using the one or more unique session keys until the secure communication session terminates. Alternatively, the secure communication module 218 and the server 118 may use Diffie-Hellman key exchange to securely generate unique session keys for encryption and decryption during the secure communication session.

The download module 220 may be tasked with downloading a new remote support client application 112 from the device management engine 124. In some embodiments, the download module 220 may receive a download command from the device management engine 124. Upon receiving the download command, the download module 220 may trigger the secure communication module 218 to initiate a secure communication session with the server 118. Subsequently, the download module 220 may receive an installer package 232 for the remote support client application 112 from the server 118 via the secure communication session. The installer package 232 may be protected using public key infrastructure (PKI). Accordingly, the installer package 232 for the remote support client application 112 may be accompanied by a private key encrypted hash of the installer package 232. The private key may be a counterpart to the public key 228 of the server 118 that is stored in the secure storage 226 of the user device 108 during the implementation of TLS. In various embodiments, the hash of the installer package 232 may be generated using a cryptographic hash algorithm, such as a MD5 message-digest algorithm, or a Secure Hash Algorithm (SHA), e.g., SHA-256, SHA-512, etc.

Once the download module 220 receives the installer package 232 and the encrypted hash via the secure communication session, the download module 220 may decrypted the encrypted hash using the public key 228 to obtain a decrypted hash. The download module 220 may also generate a hash of the installer package 232 using an identical cryptographic hash algorithm. Accordingly, if the hash generated by the download module 220 matches the decrypted hash, the download module 220 may store the installer package 232 in the secure storage 226. Otherwise, the download module 220 may delete the installer package 232.

In other embodiments, the download module 220 may obtain an updated version of the of the remote support client application 112 from the device management engine 124. In such embodiments, the download module 220 may send a request for a remote support eligibility status via a secure communication session to the device management engine 124. In some instances, the request may further include a hash of an existing version of the remote support client application on the user device 108. Accordingly, the device management engine 124 may confirm whether the user device 108 is eligible for remote support and a new version of the remote support client application is available. Following confirmation, the device management engine 124 may send the installer package for a new version of the remote support client application, as well as an encrypted hash of the installer package, to the download module 220 in the same manner as described above.

In additional embodiments, the download module 220 may be configured to prompt the user 136 for permission prior to performing the download or update of the remote support client application 112. For example, the download module 220 may present one or more dialogue boxes on the display of the user device 108 to ask for and receive download or update permission before proceeding with the download or update.

The installation module 222 may initiate an installation of a remote support client application onto the user device 108 from an installer package, such as from the installer package 232. In various embodiments, the installation module 222 may receive an install command (e.g., the install command 140) from the device management engine 124. The install command may be accompanied by a message authentication code. In at least one embodiment, the message authentication code may be a Hashed Message Authentication Code (HMAC) that is generated from the install command using a cryptographic hash function and a cryptographic key. For instance, the cryptographic hash function may be a MD5 function or a SHA function, and the cryptographic key may be a shared secret, such as the shared secret 230 that is stored in the secure storage 226.

Accordingly, the installation module 222 may validate the received install command using the message authentication code. In at least one embodiment, the installation module 222 may generate its own message authentication code from the received install command using an identical cryptographic function and the shared secret. The message authentication code as generated by the installation module 222 is then compared to the message authentication code received with the install command from the device management engine 124. Accordingly, once the installation module 222 has validated the install command, the installation module 222 may initiate an installation of the remote support client application. Otherwise, the installation module 222 may determine that the install command is invalid. In various embodiments, the installation module 222 may provide installation status updates to the device management engine 124. In turn, the device management engine 124 may pass the installation status updates to the customer care engine 120.

In additional embodiments, the installation module 222 may be configured to prompt the user 136 for permission prior to performing the installation of the remote support client application 112. For example, the installation module 222 may present one or more dialogue boxes on the display of the user device 108 to ask for and receive installation permission before proceeding with the installation.

The execution module 224 may initiate the execution of the remote support client application 112 on the user device 108. The execution of the remote support client application 112 may cause the client application to start a remote support session with the remote support application 114. In some embodiments, the execution module 224 may be triggered by the installation module 222 to automatically initiate the execution following an installation of the remote support client application 112. In other embodiments, the execution module 224 may be triggered by an execution command (e.g., the execution command 146) that is received from the device management engine 124. The execution command may be accompanied by a message authentication code in a similar manner as the install command. Accordingly, the execution module 224 may initiate the execution of the remote support client application 112 when the execution command is validated by the message authentication code.

In at least one embodiment, the execution module 224 may present a prompt for authorization from the user 136 prior to executing the remote support client application 112 to start a remote support session. The prompt may be presented on a display of the user device 108. In one example, the prompt may be for an alphanumeric code. The alphanumeric code may be generated by the device management engine 124 and passed to the customer care engine 120 for display on the interface application 132. The alphanumeric code may be further provided to the execution module 224 along with the execution command. Accordingly, the customer service representative 126 who is engaged in a telephone support call may read the alphanumeric code to the user 136. In turn, the user 136 may input the alphanumeric code into the execution module 224. The execution module 224 may initiate the execution of the remote support client application 112 when the inputted alphanumeric code matches the alphanumeric code received from the device management engine 124. In an alternative implementation, no alphanumeric code is provided by the device management engine 124 to the execution module 224. Instead, the execution module 224 may send an inputted alphanumeric code to the device management engine 124 via a secure communication session. The device management engine 124 may verify that the alphanumeric code received from the execution module 224 matches the alphanumeric code as originally generated. Once verified, the device management engine 124 may send a verification confirmation message to the execution module 224 via the secure communication session. As such, the execution module 224 may initiate the execution of the remote support client application 112 to start a remote support session in response to the verification confirmation message. The act of providing alphanumeric code by the user 136 may also serve as an indication of the user's consent to remote support.

In an alternative instance, the authorization that is prompted by the execution module 224 may be in the form of an electronic signature or another electronic affirmation that is inputted by the user 136. For example, the user 136 may use a keypad or touch screen of the user device 108 to input such electronic authorization. The execution module 224 may provide the electronic authorization to the device management engine 124 via a secure communication session. Once the electronic authorization is received, the device management engine 124 may store the electronic authorization and send an authorization confirmation message to the execution module 224 via the secure communication session. Accordingly, the execution module 224 may initiate the execution of the remote support client application 112 to start a remote support session in response to the authorization confirmation message. The stored electronic authorization may be used as proof that the user consents to remote support.

Example Server Components

Figure 3:
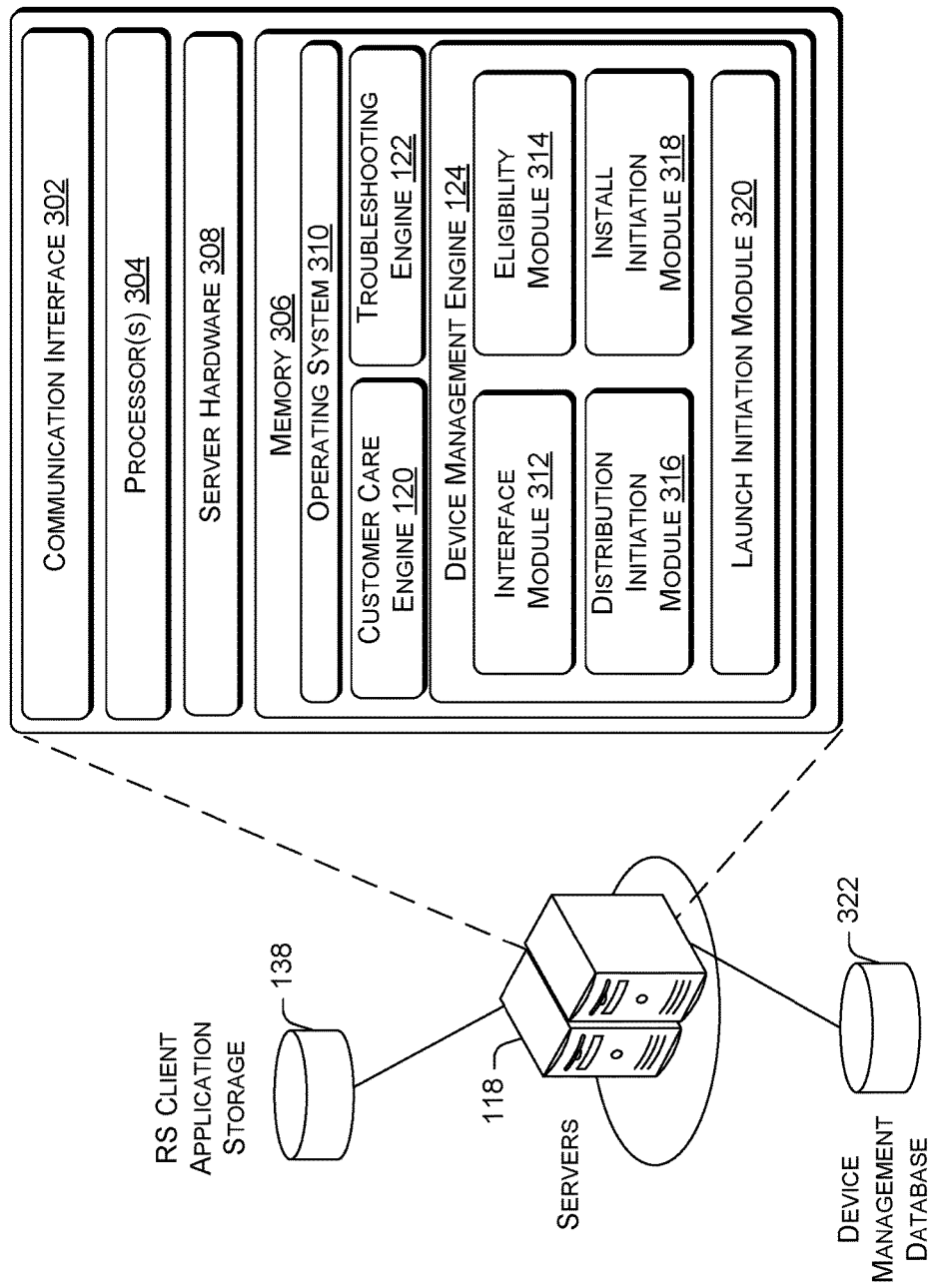
FIG. 3 is a block diagram showing various components of an illustrative server that implements a remote support installation mechanism for installing and executing a remote support client application on a user device.

FIG. 3 is a block diagram showing various components of an illustrative server that implements a remote support installation mechanism for installing and executing a remote support client application on a user device. The servers 118 may include a communication interface 302, one or more processors 304, memory 306, and server hardware 308. The communication interface 302 may include wireless and/or wired communication components that enable the server to transmit data to and receive data from other networked devices. The server hardware 308 may include additional hardware that performs interface, data display, data communication, data storage, and/or other server functions.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 304 and the memory 306 of the servers 118 may implement an operating system 310, the customer care engine 120, the troubleshooting engine 122, and the device management engine 124. The operating system 310 may include components that enable the servers 118 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The device management engine 124 may include an interface module 312, an eligibility module 314, a distribution initiation module 316, an install initiation module 318, and a launch initiation module 320. Each of the modules may include routines, program instructions, objects, and/or data structures that perform particular tasks or implement particular abstract data types.

The interface module 312 may send data to and receive data from the customer care engine 120. In various embodiments, the data received from the customer care engine 120 may include requests to initiate downloads of installer packages for remote support client applications, installation of the installer packages, and execution of remote support client applications on user devices. The data sent by the interface module 312 to the customer care engine 120 may include download and installation progress updates that are provided by the device agent application 110 on the user device 108.

The interface module 312 may also cooperate with the secure communication module 218 of the device agent application 110 to establish secure communication sessions. Further, the interface module 312 may also include encryption algorithms and logic that are used to support PKI. In this way, the interface module 312 may generate hashes of installer packages for the remote support client application using a private key of the servers 118. Further, the interface module 312 may also generate message authentication codes for the various commands that are initiated by the device agent application 110.

The eligibility module 314 may receive remote support eligibility status requests from the device agent application 110. Each of the status request may include device identification information of a corresponding user device that initiated the status request. The device identification information may include a make, a model, a serial number, etc., of the user device. In this way, the eligibility module 314 may check a device management database 322 to determine whether the user device qualifies for remote support. The device management database 322 may include a list of user device for which remote support client application are available. In some instances, the eligibility module 314 may also check a user account database to determine that a user device meets one or more criteria for remote support. For example, a policy of the wireless communication carrier may dictate that remote support may be provided to user devices of users with postpaid accounts rather than prepaid accounts. In an additional example, another policy may dictate that user devices of users with a predetermined number and/or amounts of past due payments are not entitled to remote support.

In some instances, an eligibility status request from a user device may be accompanied by a hash of an installer package for the remote support client application. In such instances, the eligibility module 314 may check the hash against a hash of an installer package for a latest version of the remote support client application. Accordingly, if the eligibility module 314 determines that the hashes are different, the eligibility module 314 may retrieve the installer package for the latest version of the remote support application from the remote support client application storage 138. In this way, the eligibility module 314 may use the interface module 312 to deliver the installer package to the device agent application 110 via a secure communication session. However, if the eligibility module 314 determines that the hashes are same, then no new installer package is retrieved and sent by the eligibility module 314 as the user device 108 is already preloaded with the latest version.

The distribution initiation module 316 may distribute installer packages of remote support client applications to user devices in circumstances where the installer packages are not already loaded on the user devices. The information regarding whether user devices have the installer packages loaded on the user devices may be stored in the device information database. Accordingly, when a user calls the customer service representative 126 regarding a particular user device, the customer care engine 120 may access the device information database using the identification information of the user device to determine whether the particular user device has the installer package loaded. The device information database may further indicate whether the user device has been powered up for more than a predetermined amount of time.

The identification information of the user device may be provided by the user during the call or deduced by the customer care engine 120 from an associated telephone number that is assigned to the user device. The customer care engine 120 may further direct the distribution initiation module 316 to check the device management database 322 to determine whether an installer package is available for the particular user device. In various embodiments, the device management database 322 may further include information such as the classes of customer care service representatives that are permitted to distribute, install, and/or initiate execution of each installer package. For example, a level two technical representative may have permission to distribute, install, and initiate execution of an installer package, while a level one general support representative may not have permission do so. As such, the customer care engine 120 may verify that the customer service representative 126 who is using the interface application 132 to access information regarding the particular user device is permitted to distribution the installer package to the particular user device.

In the event that the customer care engine 120 determines that an available installer package is not loaded on the particular user device, and the customer service representative is permitted to distribute the installer package, the customer care engine 120 may direct the interface application 132 to render a download control. For example, the download control may be a download button that is rendered on a customer service interface displayed by the interface application 132. Upon activation of the download control by the customer service representative 126, the customer care engine 120 may trigger the distribution initiation module 316 to send a corresponding installer package from the remote support client application storage 138 to the particular user device. In some alternative embodiments, the customer care engine 120 may automatically trigger the distribution of the installer package by the distribution initiation module 316. The distribution may be triggered upon detecting via the IVR function that the user is seeking support for the particular user device and the customer service representative belongs to a permitted class.

As the particular user device performs the download, the device may provide download status updates to the distribution initiation module 316. In turn, the distribution initiation module 316 may forward the download status updates to the customer care engine 120 for eventual presentation on the interface application 132. Further, the distribution initiation module 316 may store the download status updates in the device management database 322. In some embodiments, the distribution initiation module 316 may distribute an installer package to a user device in response to a request from the troubleshooting engine 122.

In various embodiments, the distribution initiation module 316 may distribute the installer package to the particular user device via a secure communication session between the server 118 and the particular user device. Further, the installer package may be distributed with a private key encrypted hash of the installer package such that a device agent application of the particular user device may verify the authenticity of the installer package.

The install initiation module 318 may trigger a user device to install a remote support client application from an installer package loaded on the user device. In some embodiments, the installation may be triggered based on a request from the customer care engine 120. In such embodiments, the customer care engine 120 may check the device management database 322 to verify that a customer service representative who is providing support for the particular user device belongs to a representative class that is authorized to initiate the installation. The customer care engine 120 may further check the device management database 322 to verify that the installer package is loaded on the particular user device.

Thus, in the event that the customer care engine 120 determines that the customer service representative is permitted to initiate installation and an installation package is available on the user device, the customer care engine 120 may direct the interface application 132 to render an install control. For example, the install control may be an install button that is rendered on a customer service interface displayed by the interface application 132. Upon activation of the install control by the customer service representative 126, the customer care engine 120 may trigger the install initiation module 318 to command a device agent application to install the remote support client application from an installer package stored on the user device. In some alternative embodiments, the customer care engine 120 may automatically trigger the installation of the remote support client application from the installer package.

In some instances, the installation may be further triggered upon detecting via the IVR function that the user is seeking support for the particular user device and the customer service representative belongs to a permitted class. The install initiation module 318 may trigger the installation by sending an install command via the Internet 142 and/or the wireless carrier network 102. In some embodiments, the install initiation module 318 may use the interface module 312 to generate a message authentication code for the install command, such that a device agent application on the particular user device may authenticate the install command using the message authentication code.

As the particular user device performs the installation, the device may provide installation status updates to the install initiation module 318. In turn, the install initiation module 318 may forward the download status updates to the customer care engine 120 for eventual presentation on the interface application 132. Further, the install initiation module 318 may store the installation status updates in the device management database 322. In some embodiments, the install initiation module 318 may initiate an installation of a remote support client application on a user device in response to a request from the troubleshooting engine 122.

The launch initiation module 320 may trigger a user device to initiate an execution of the remote support client application on the user device. In some embodiments, the launch initiation module 320 may trigger an execution based on a request from the customer care engine 120. In such embodiments, the customer care engine 120 may check the device management database 322 to verify that a customer service representative who is providing support for the particular user device belongs to a representative class that is authorized to initiate the execution. The customer care engine 120 may further check the device management database 322 to verify that the remote support client application is installed on the particular user device.

Thus, in the event that the customer care engine 120 determines that the remote support client application is installed and the customer service representative is permitted to initiate execution, the customer care engine 120 may direct the interface application 132 to render an execution control. For example, the execution control may be a start button that is rendered on a customer service interface displayed by the interface application 132. Upon activation of the execution control by the customer service representative 126, the customer care engine 120 may trigger the launch initiation module 320 to command a device agent application to start the execution of the remote support client application on the user device. In some alternative embodiments, the customer care engine 120 may automatically trigger the execution the remote support client application. The execution may be triggered upon detecting via the IVR function that the user is seeking support for the particular user device and the customer service representative belongs to a permitted class. In some embodiments, the launch initiation module 320 may initiate an execution of a remote support client application on a user device in response to a request from the troubleshooting engine 122. The launch initiation module 320 may generate a message authentication code for the execution command, such that a device agent application on the particular user device may authenticate the execution command using the message authentication code. Additionally, the launch initiation module 320 may also perform alphanumeric code generation and user authorization input verification functions to support the user execution verification performed by the execution module 224 of the device agent application 226.

Accordingly, the device management engine 124 may use the various modules to prepare for the remote support of a user device in multiple ways. In one way, a user device may be preloaded with an installer package for a remote support client application, which may be periodically updated as new installer packages for new versions available. The installation and/or execution of the remote support client application is then triggered at a later time by a customer service representative during a support call or a troubleshooting engine.

In another way, no installer package is preloaded on a user device. During a customer support call, the customer service representative may trigger the download, installation, and execution of the remote support client application on demand. In an additional way, the download, installation, and/or execution of the remote support client application may be automatically triggered by the placement of a support call to a customer service representative or a troubleshooting engine without any user or representative intervention. Alternatively, the download and installation may be automatically triggered, but the execution of the remote support client application to initiate a remote support session may be manually trigged by the customer service representative with the permission of the user.

Example Processes

FIGS. 4-8 present illustrative processes 400-800 for implementing a remote support installation mechanism that installs and executes a remote support client application on a user device. Each of the processes 400-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-800 are described with reference to the architecture 100 of FIG. 1.

Figure 4:
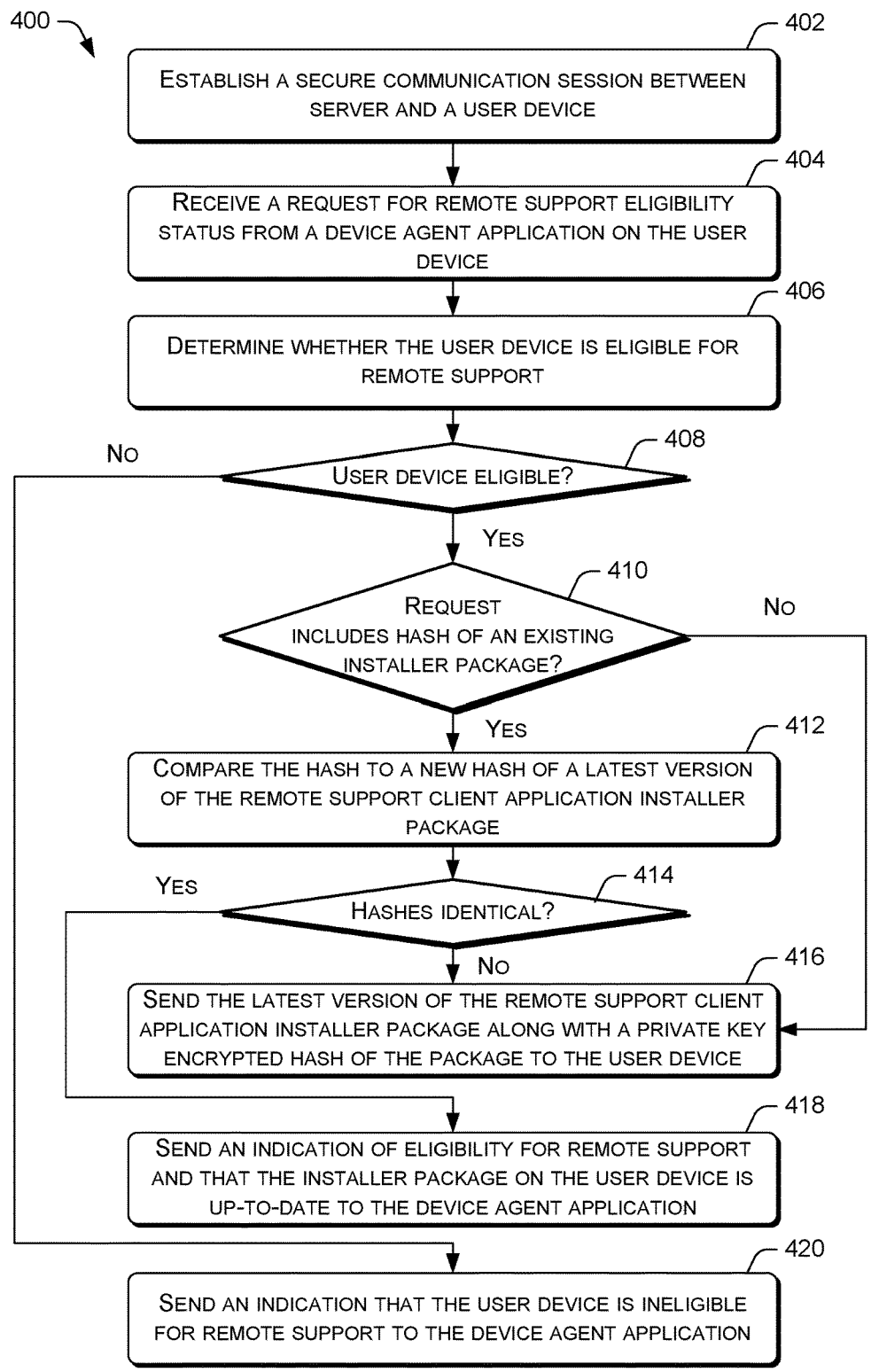
FIG. 4 is a flow diagram of an example process for determining an eligibility of a user device for remote support and ensuring that the user device is updated with a latest version of the remote support client application.

FIG. 4 is a flow diagram of an example process 400 for determining an eligibility of a user device for remote support and ensuring that the user device is updated with a latest version of the remote support client application. At block 402, the servers 118 may establish a secure communication session with the user device 108. In various embodiments, the secure communication session may be established via TLS through the use of a public-private key pair and a shared secret.

At block 404, the device management engine 124 on the servers 118 may receive a request for remote support eligibility status from the device agent application 110 on the user device 108. The device agent application 110 may periodically send such requests to the device management engine 124. For example, such requests may be sent at regular intervals (e.g., every 24 hours, every 48 hours, etc.).

At block 406, the device management engine 124 may determine whether the user device 108 is eligible for remote support. In various embodiments, the determination may be made based on device information of the user device 108 and/or account information regarding a user account that is associated with the user device 108. Accordingly, at decision block 408, if the device management engine 124 determines that the user device 108 is eligible for remote support ("yes" at decision block 408), the process 400 may proceed to decision block 410.

At decision block 410, the device management engine 124 may determine whether the request from the user device 108 includes a hash of an existing installer package for the remote support client application 112. Accordingly, if the device management engine 124 determines that the requests includes the hash ("yes" at decision block 410), the process 400 may proceed to block 412.

At block 412, the device management engine 124 may compare the hash to a new hash of a latest version of the remote support client application. In various embodiments, the hashes may be generated using a cryptographic hash algorithm, such as a MD5 message-digest algorithm, or a Secure Hash Algorithm (SHA), e.g., SHA-256, SHA-512, etc. Thus, if the device management engine 124 determines at decision block 414 that the hashes are not identical ("no" at decision block 414), the process 400 may proceed to block 416.

At block 416, the device management engine 124 may send the latest version of the installer package for the remote support client application 112 along with a private key encrypted hash of the installer package to the user device 108. In various embodiments, the private key may be a counterpart to the public key 228 of the server 118 that is stored in the secure storage 226 of the user device 108 during the implementation of TLS.

Returning to decision block 414, if the device management engine 124 determines that the hashes are identical ("yes" at decision block 414), the process 400 may proceed to block 418. At block 418, the device management engine 124 may send an indication of eligibility for remote support to the device agent application 110 on the user device 108. In some instances, the device management engine 124 may also concurrently indicate that the installer package for the remote support client application on the user device is up-to-date.

Returning to decision block 410, if the device management engine 124 determines that the requests does not include a hash ("no" at decision block 410), the process 400 may also proceed to block 416. Returning to decision block 408, if the device management engine 124 determines at decision block 408 that the user device 108 is not eligible for remote support ("no" at decision block 408), the process 400 may proceed to block 420. At block 420, the device management engine 124 may send an indication that the user device is ineligible for remote support to the device agent application 110.

Figure 5:
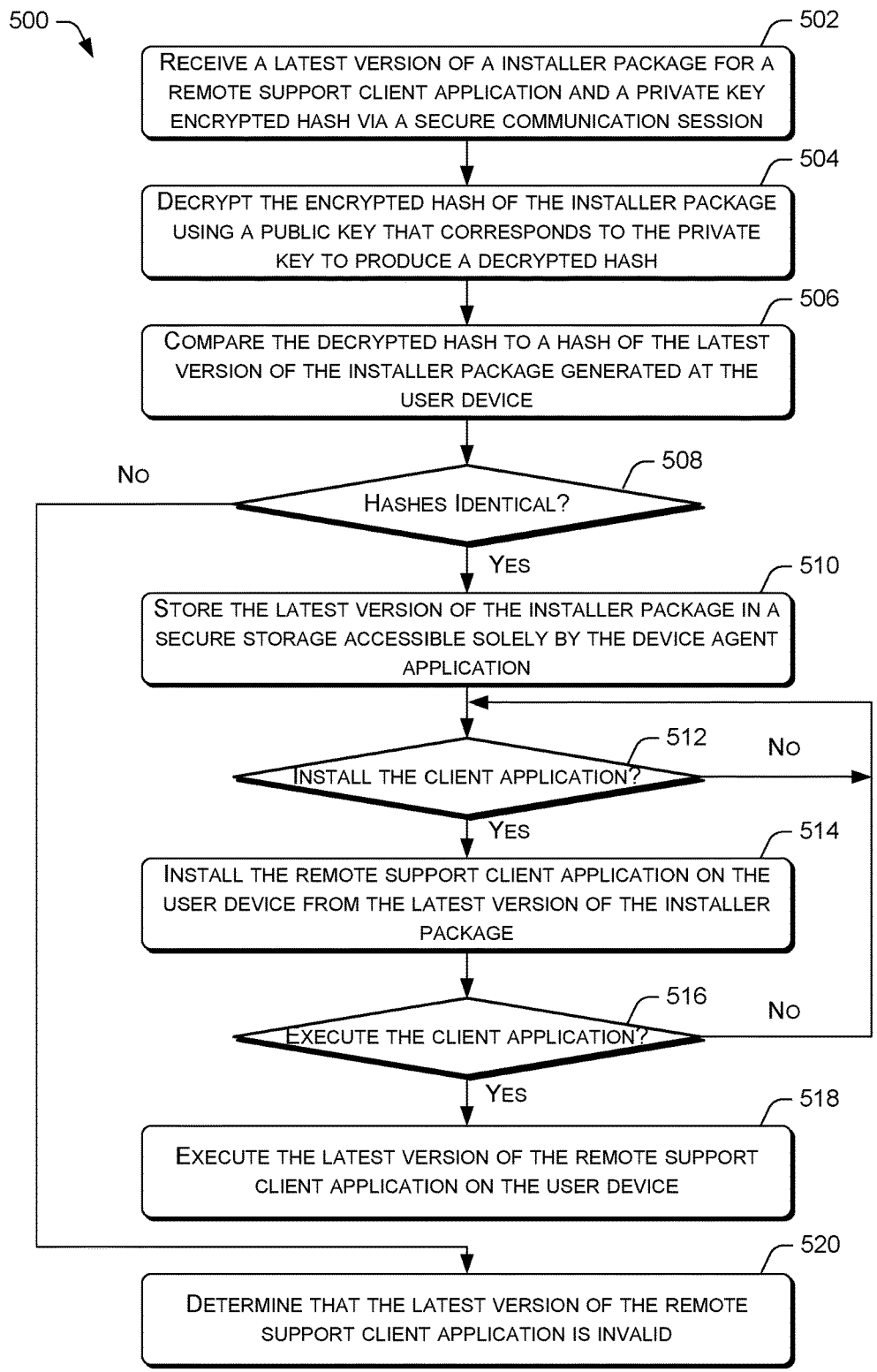
FIG. 5 is a flow diagram of an example process for receiving a latest version of a remote support client application at a user device for installation and execution.

FIG. 5 is a flow diagram of an example process 500 for receiving a latest version of a remote support client application at a user device for installation and execution. At block 502, the device agent application 110 may receive a latest version of an installer package for the remote support client application 112 from the servers 118 via a secure communication session. Further, the remote support client application 112 may be accompanied by a private key encrypted hash of the installer package. In various embodiments, the private key may be a counterpart to the public key 228 of the server 118 that is stored in the secure storage 226 of the user device 108 during the implementation of TLS.

At block 504, the device agent application 110 may decrypt the encrypted hash of the installer package using the public key 200 that corresponds to the private key to produce a decrypted hash. At block 506, the device agent application 110 may generate a hash for the latest version of the installer package as received from the servers 118 at the user device. In various embodiments, the hash may be generated using the same hashing algorithm that was used on the servers 118.

At decision block 508, the device agent application 110 may determine whether the decrypted hash and the hash of the latest version of the installer package as generated by the device agent application 110 are identical. Accordingly, if the device agent application 110 determines that the hashes are identical ("yes" at decision block 508), the process 500 may proceed to block 510. At block 510, the device agent application 110 may store the latest version of the installer package for the remote support client application 112 in the secure storage 226 of the memory 210.

At decision block 512, the device agent application 110 may determine whether to install the remote support client application 112 from the latest version of the installer package. In various embodiments, the device agent application 110 may initiate the installation based on an install command 140 from device management engine 124. Thus, if the device agent application 110 determines that the client application is to be installed ("yes" at decision block 512), the process 500 may proceed to block 514. At block 514, the device agent application 110 may installed the remote support client application 112 from the latest version of the installer package.

At decision block 516, the device agent application 110 may determine whether to execute the client application. In various embodiments, the device agent application 110 may initiate the execution based on an execution command 146 from device management engine 124. Thus, if the device agent application 110 determines that the client application is to be executed ("yes" at decision block 516), the process 500 may proceed to block 518. At block 518, the device agent application 110 may execute the installed remote support client application 112.

Returning to decision block 508, if the device agent application 110 determines that the hashes are not identical ("no" at decision block 508), the process 500 may proceed to block 520. At block 520, the device agent application 110 may determine that the latest version of the remote support client application is invalid. In some embodiments, the device agent application 110 may discard, i.e., wipe the latest version from the secure storage 226 of the memory 210.

Returning to decision block 512, if the device agent application 110 determines that the client application is not to be installed ("no" at decision block 512), the process 500 may loop back to decision block 512. Returning to decision block 516, if the device agent application 110 determines that the client application is not to be executed ("no" at decision block 516), the process 500 may once again loop back to the decision block 512.

Figure 6:
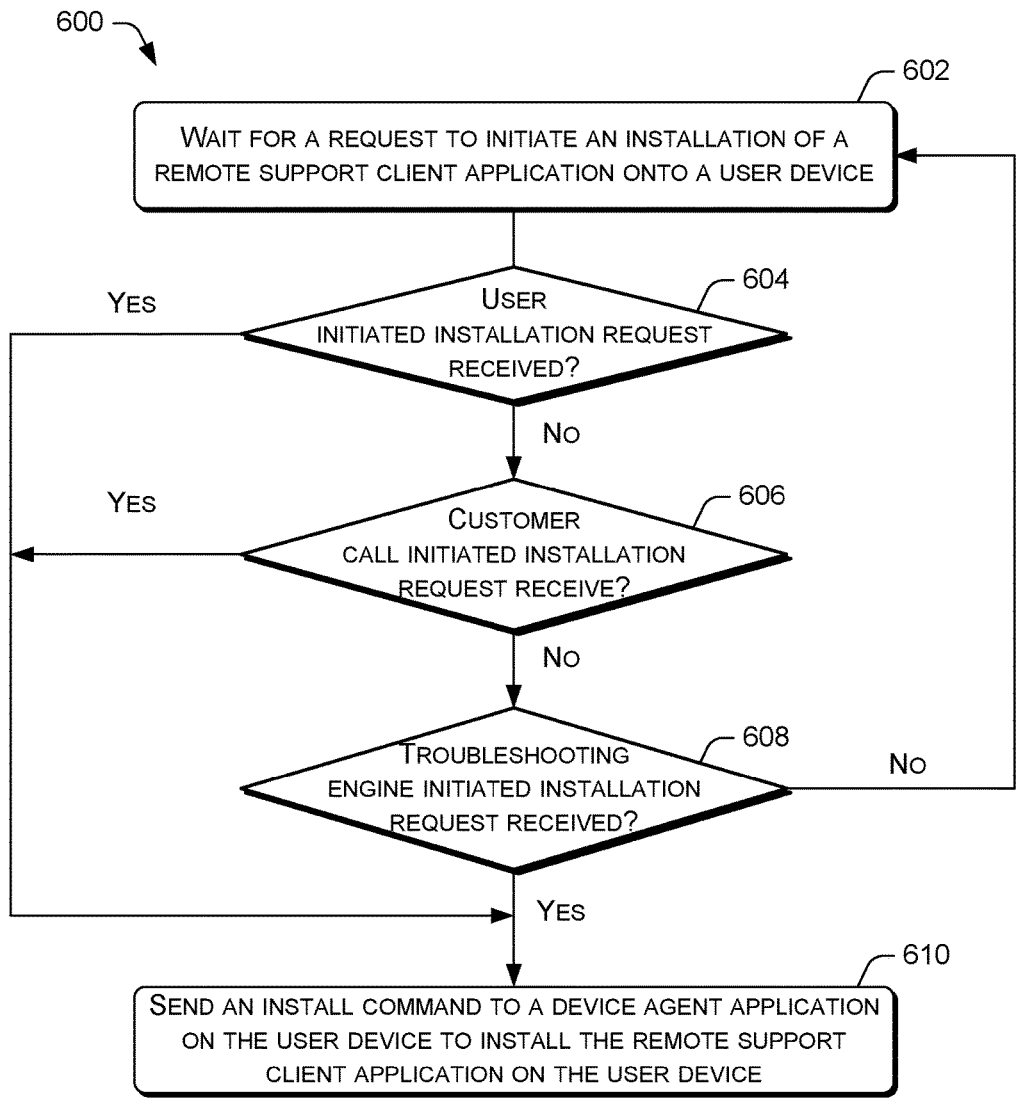
FIG. 6 is a flow diagram of an example process for triggering the installation of a remote support client application on a user device based on multiple factors.

FIG. 6 is a flow diagram of an example process 600 for triggering the installation of a remote support client application on a user device based on multiple factors. At block 602, the device management engine 124 may waiting for a request to initiate an installation of a remote support client application onto a user device, such as the user device 108. In some embodiments, the remote support client application may be installed from an installer package that is preloaded onto the user device. In other embodiments, the remote support client application may be installed from an installer package that is distributed to the user device by the device management engine 124.

At decision block 604, the device management engine 124 may determine whether a user initiated installation request is received by the device management engine 124. In various embodiments, the installation request may be initiated by a customer service representative at a customer care terminal, such as the customer care terminal 128. The installation request may be received at the customer care engine 120 and passed to the device management engine 124. Accordingly, if the device management engine 124 determines that no user initiated installation request is received at the device management engine 124 ("no" at decision block 604), the process 600 may proceed to decision block 606.

At decision block 606, the device management engine 124 may determine whether a customer call initiated installation request is received. In various embodiments, the customer care engine 120 may send the installation request to the device management engine 124 upon detecting via the IVR function that a customer is seeking support for the user device and the customer service representative belongs to a permitted class of representatives that are authorized to provide remote support to the customer. Accordingly, if the device management engine 124 determines that no customer call initiated installation request is received at the device management engine 124 ("no" at decision block 606), the process 600 may proceed to decision block 608.

At decision block 608, the device management engine 124 may determine whether a troubleshooting engine initiated installation request is received. In various embodiments, the troubleshooting engine 122 may initiate the installation request when the troubleshooting engine 122 determines that the user device 108 is experiencing a device issue that is to be resolved via remote intervention. Accordingly, if the device management engine 124 determines that a troubleshooting engine 122 initiated installation request is received at the device management engine 124 ("yes" at decision block 608), the process 600 may proceed to block 610. At block 610, the device management engine 124 may send an install command to a device agent application on the user device to install the remote support client application on the user device. However, if the device management engine 124 determines that a troubleshooting engine 122 initiated installation request is not received at the device management engine 124 ("no" at decision block 608), the process 600 may loop back to block 602.

Returning to decision block 604, if the device management engine 124 determines that a user initiated installation request is received at the device management engine 124 ("yes" at decision block 604), the process 600 may proceed directly to block 610. Returning to decision block 606, if the device management engine 124 determines that a customer call initiated installation request is received at the device management engine 124 ("yes" at decision block 606), the process 600 may also proceed directly to block 610.

Figure 7:
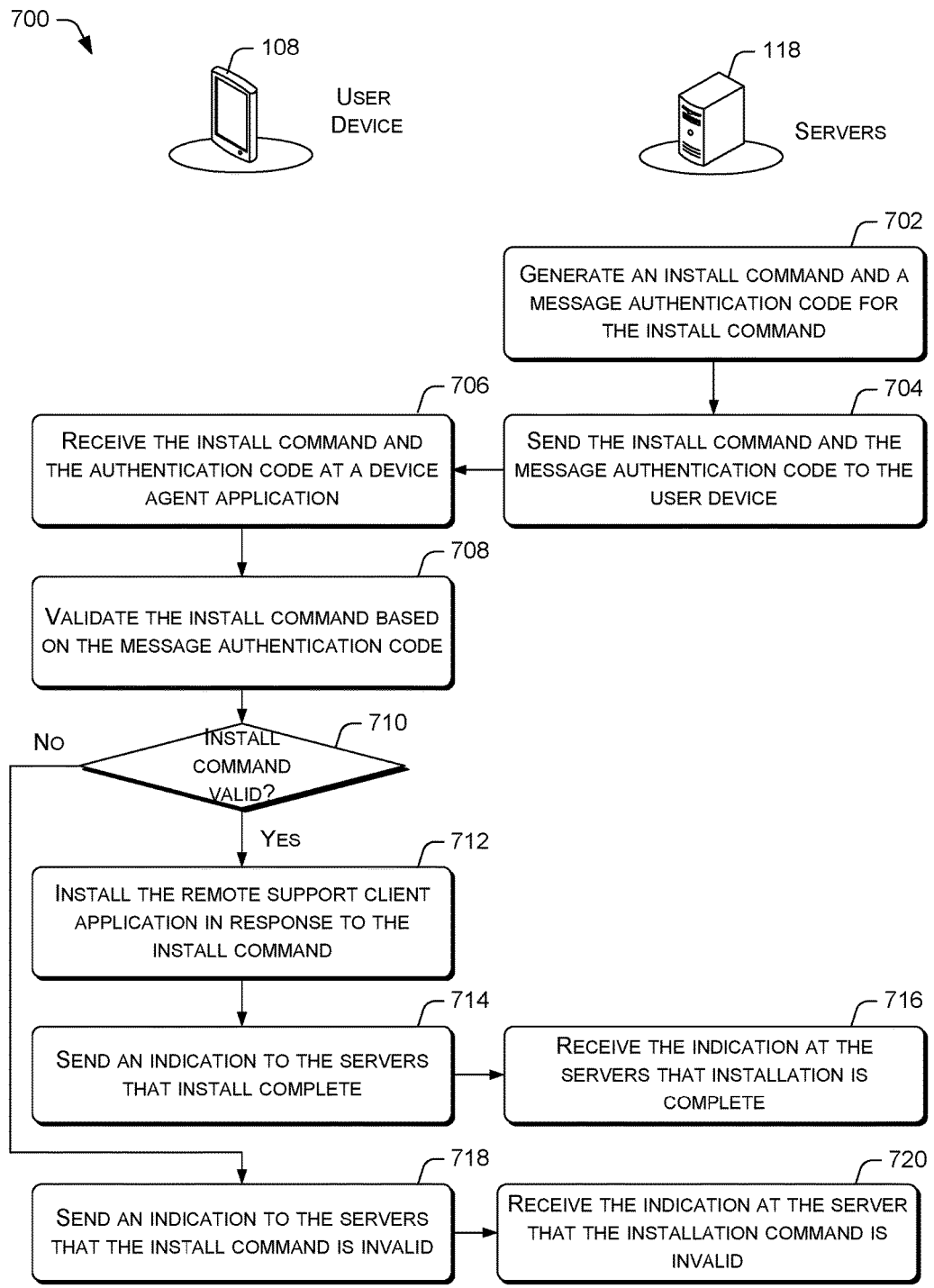
FIG. 7 is a flow diagram of an example process for providing a user device with an install command that is protected by a message authentication code such that the user device is able to verify and execute the install command.

FIG. 7 is a flow diagram of an example process 700 for providing a user device with an install command that is protected by a message authentication code such that the user device is able to verify and execute the install command. At block 702, the device management engine 124 on the servers 118 may generate an install command and a hash-based message authentic code for the install command. In various embodiments, the message authentication code may be a Hashed Message Authentication Code (HMAC) that is generated from the install command using a cryptographic hash function and a cryptographic key. For instance, the cryptographic hash function may be a MD5 function or a SHA function, and the cryptographic key may be a shared secret, such as the shared secret 230 that is stored in the secure storage 226.

At block 704, the device management engine 124 may send the install command and the message authentication code to the user device 108. In various embodiments, the device management engine 124 may send the install command and the message authentication code as a data push via the Internet, as a SMS message via the wireless carrier network 102, or both. In various embodiments, the communication between the server 118 and the user device 108 may be exchange via a secure communication session.

At block 706, the device agent application 110 on the user device 108 may receive the install command and the authentication code. For example, the install command may be the install command 140. At block 708, the device agent application 110 may validate the install command based on the message authentication code. In various embodiments, the device agent application 110 may generate its own message authentication code from the received install command using an identical cryptographic function and the shared secret. As such, the device agent application 110 may determine that the install command is valid when the received message authentication code is identical to the message authentication code generated by the device agent application 110.

At decision block 710, if the device agent application 110 determines that the install command is valid ("yes" at decision block 710), the process 700 may proceed to block 712. At block 712, the device agent application 110 may install the remote support client application in response to the install command. In various embodiments, the remote support client application may be installed from an installer package that is preloaded on the user device 108 or distributed to the user device 108 by the device management engine 124.

At block 714, the device agent application 110 may send an indication to the servers 118 indicating that the install is complete. In various embodiments, the indication may be sent via the secure communication session between the user device 108 and the servers 118. At block 716, the servers 118 may receive the indication that the installation is complete. In various embodiments, the device management engine 124 on the servers 118 may process the indication and forward the indication to the customer care engine 120 on the servers 118.

Returning to decision block 710, if the device agent application 110 determines that the install command is invalid ("no" at decision block 710), the process 700 may proceed to block 718. At block 718, the device agent application 110 may send an indication to the servers 118 indicating that the install command is invalid. In various embodiments, the indication may be sent via the secure communication session between the user device 108 and the servers 118. At block 716, the servers 118 may receive the indication that the install command is invalid. In some embodiments, the device management engine 124 on the servers 118 may attempt to send another install command.

Figure 8:
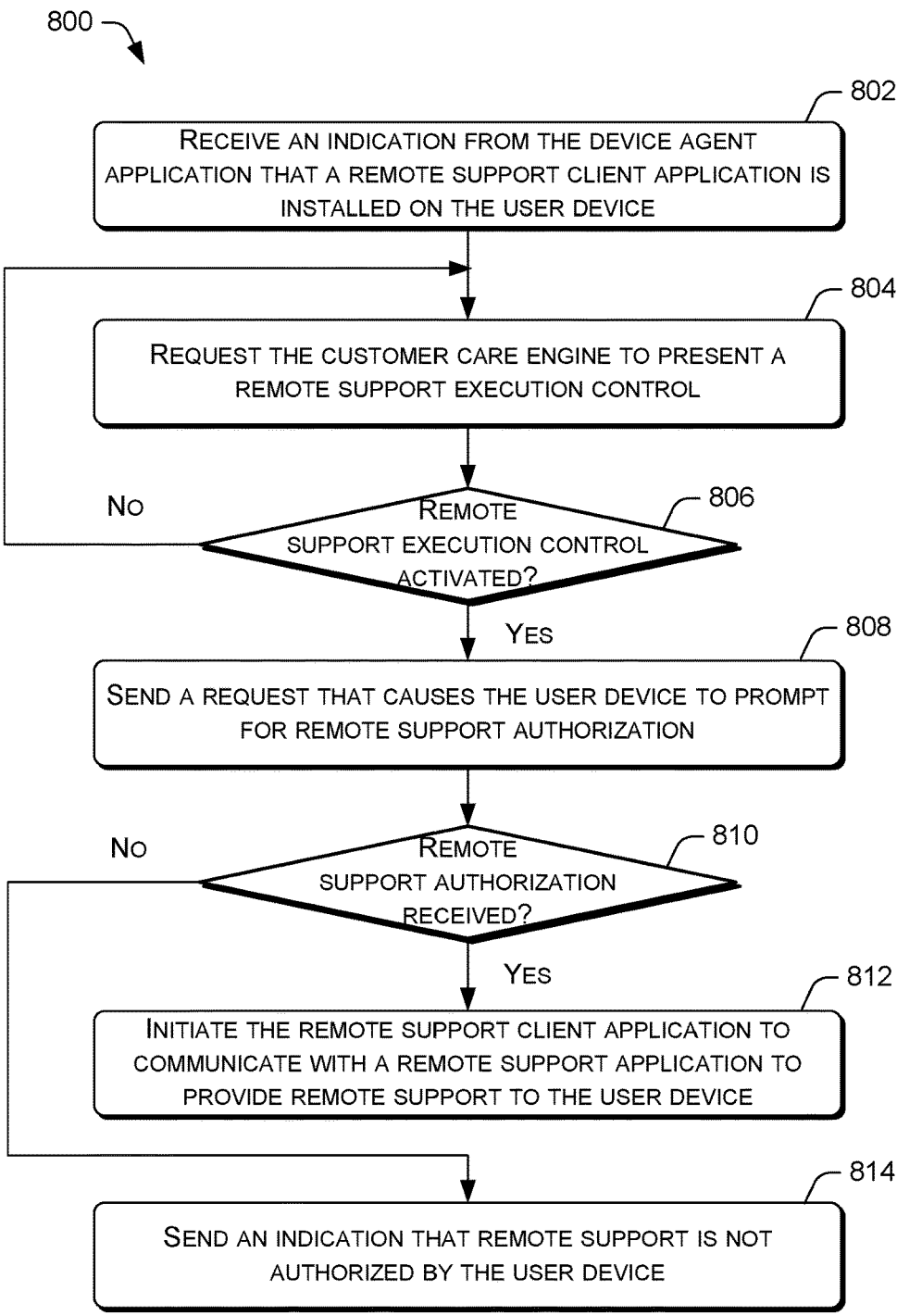
FIG. 8 is a flow diagram of an example process for initiating an execution of a remote support client application for communicating with a remote support application.

FIG. 8 is a flow diagram of an example process 800 for initiating an execution of a remote support client application for communicating with a remote support application. At block 802, the device management engine 124 may receive an indication from a device agent application on a user device. The indication may state that a remote support client application is installed on the user device. At block 804, the device management engine 124 may request that the customer care engine 120 present a remote support execution control. In various embodiments, the customer care engine 120 may cause the remote support execution control to be presented by an interface application (e.g., interface application 132) on a customer care terminal, such as the customer care terminal 128.

At decision block 806, the device management engine 124 may determine whether the remote support execution control is activated. In various embodiments, the remote support execution control may be activated by a customer service representative via the interface application. Accordingly, if the remote support execution control is activated ("yes" at decision block 806), the process 800 may proceed to block 808.

At block 808, the device management engine 124 may send a request that causes the user device to prompt for remote support authorization. In various embodiments, the remote support authorization that is prompted may be an alphanumeric code or an electronic signature that signifies that a user of the user device consents to remote support. The remote support authorization request may be sent via a secure communication session between the servers 118 and the user device. The prompt may be presented by a device agent application on the user device.

At decision block 810, the device management engine 124 may determine whether the remote support authorization is received from the user device. In various embodiments, the remote support authorization may be acquired by the device agent application on the user device and sent to the device management engine 124 via the secure communication session between the servers 118 and the user device. Accordingly, if the device management engine 124 determines that the remote support authorization is received ("yes" at decision block 810), the process 800 may proceed to block 812.

At block 812, the device management engine 124 may initiate the remote support client application to communicate with a remote support application on a remote support server, so that remote support may be provided to the user device. In various embodiments, device management engine 124 may perform the initiation by sending an execution command 146 to the device agent application on the user device, and the device agent application may in turn trigger the execution of the remote support client application.

Returning to decision block 810, if the device management engine 124 determines that the remote support authorization is not received ("no" at decision block 810), the process 800 may proceed to block 814. At block 814, the device management engine 124 may send an indication to the customer care engine 120 indicating that the remote support is not authorized by the user device. The indication may be sent via a secure communication session between the servers 118 and the user device. In turn, the customer care engine 120 may cause an interface application on a customer care terminal to display to the indication to a customer service representative. Returning to decision block 806, if the remote support execution control is not activated ("no" at decision block 806), the process 800 may loop back to block 804.

The remote support installation mechanism provides for the installation of a remote support client application onto a user device in a semi-autonomous or autonomous manner. The remote support installation mechanism may enable a customer service representative to assist a customer in resolving a technical issue with the user device in a more expedient manner. For example, the customer may lack the familiarity or technical expertise to understand the verbal troubleshooting instructions provided by the customer service representative over a customer care call. In such instances, the ability of the customer service representative to use a remote support client application that has been semi-autonomously or autonomous installed onto the user device to provide remote support may greatly reduce issue determination and issue resolution time. Thus, the techniques may reduce customer service support cost and time, as well as increase customer satisfaction and customer retention.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
receiving a request for a remote support eligibility status from a device agent application on a user device that is preloaded with an installer package for a remote support client application, the remote support client application to initiate a remote support session with the remote support application on a remote support server to provide a computing terminal with remote support access to the user device, and wherein the installer package comprises at least one of: a setup file, a library file, or an installation utility for installing the remote support client application on the user device, wherein the request for the remote support eligibility status includes a hash of the installer package preloaded on the user device;
comparing the hash to a new hash of a latest version of the installer package for the remote support client application;
sending the latest version of the installer package for the remote support client application along with a private key encrypted hash of the latest version of the installer package to the user device in response to the hash and the new hash being different;
sending an indication that the installer package on the user device is up-to-date to the device agent application on the user device in response to the hash and the new hash being identical;
determining based on at least one of a device management database or a user account database that the user device qualifies for remote support in response to the request for the remote support eligibility status;
sending an install command and a message authentication code to the user device, the install command triggers an installation of the remote support client application on the user device from the installer package following the user device qualifying for remote support; and
receiving an indication that the remote support client application is installed onto the user device from the installer package, the remote support client application being installed following the device agent application validating the install command via the message authentication code.

2. The one or more non-transitory computer-readable media of claim 1, wherein the request and the indication are received via a transport layer security (TLS) secure communication session between the user device and a server that executes the computer-executable instructions, and the install command and the message authentication code are sent to the user device via the TLS secure communication session.

3. The one or more non-transitory computer-readable media of claim 1, wherein the message authentication code is a Hashed Message Authentication Code (HMAC) that is generated from the install command using a cryptographic hash function and a cryptographic key.

4. The one or more non-transitory computer-readable media of claim 1, wherein the encrypted hash of the latest version of the installer package is to be decrypted by the device agent application using a public key of asymmetric encryption that corresponds to the private key, the public key being stored in the user device.

5. The one or more non-transitory computer-readable media of claim 4, wherein the receiving includes receiving the indication for an install of the remote support client application from the latest version of the installer package in response to a hash of the latest version of the installer package generated by the device agent application matching a decrypted hash that is decrypted from the encrypted hash via the public key.

6. The one or more non-transitory computer-readable media of claim 1, wherein the device management database includes a list of user devices for which remote support client application are available, and wherein the user account database includes service plan details and a payment history of a user that affects remote support eligibility for the user device.

7. The one or more non-transitory computer-readable media of claim 1, wherein the sending the install command includes sending the install command in response to a user initiated installation request from a customer care terminal, an installation request initiated for a customer support call that is detected via an interactive voice response (IVR) function, or a troubleshooting engine initiated installation request from the troubleshooting engine that seeks to resolve a device issue via remote intervention.

8. The one or more non-transitory computer-readable media of claim 7, wherein the user initiated installation request is initiated by a customer service representative that is authorized to provide remote support to the user device.

9. The one or more non-transitory computer-readable media of claim 1, wherein the sending includes sending the install command to the user device via at least one of an Internet connection or a wireless carrier network that provides communication services to the user device.

10. The one or more non-transitory computer-readable media of claim 1, wherein the acts further comprise sending an execution command that causes the remote support client application to initiate the remote support session with the remote support application, the execution command being sent based on a user initiated execution request from a customer care terminal, an execution request initiated for a customer support call that is detected via an interactive voice response (IVR) function, or a troubleshooting engine initiated execution request from the troubleshooting engine that seeks to resolve a device issue via remote intervention.

11. The one or more non-transitory computer-readable media of claim 10, wherein the acts further comprise sending a request that causes the user device to prompt for a remote support authorization from a user, wherein the sending the execution command includes providing the execution command to cause the device agent application to start execution of the remote support client application in response to receiving the remote support authorization that is inputted by the user at the user device.

12. The one or more non-transitory computer-readable media of claim 10, wherein inputted remote support authorization is an inputted alphanumeric code or an electronic signature.

13. A computer-implemented method, comprising:
receiving, at a server of a wireless carrier network, a request for a remote support eligibility status from a device agent application on a user device, the device agent application to use a remote support client application to initiate a remote support session with a remote support application on a remote support server, the remote support session to provide a computing terminal with remote support access to the user device, wherein the request for the remote support eligibility status includes a hash of an installer package preloaded on the user device;

comparing the hash to a new hash of a latest version of the installer package for the remote support client application;

sending the latest version of the installer package for the remote support client application along with a private key encrypted hash of the latest version of the installer package to the user device in response to the hash and the new hash being different;

sending an indication that the installer package on the user device is up-to-date to the device agent application on the user device in response to the hash and the new hash being identical;

determining, at the server, based on at least one of a device management database or a user account database that the user device qualifies for remote support in response to the request for the remote support eligibility status;

sending, from the server, an install command and a message authentication code to the user device, the install command initiated by an interactive voice response (IVR) function detecting that the user selected an option to talk to a customer service representative during a telephone call to the wireless carrier network, the install command triggers an installation of the remote support client application on the user device from the installer package, wherein the install command is sent to the user device via the wireless carrier network; and receiving, at the server, an indication that the remote support client application is installed onto the user device from the installer package, the remote support client application being installed following the device agent application validating the install command via the message authentication code.

14. The computer-implemented method of claim 13, wherein the request and the indication are received at the server via a transport layer security (TLS) secure communication session between the user device and the server, and the install command and the message authentication code are sent to the user device via the TLS secure communication session.

15. The computer-implemented method of claim 13, wherein the message authentication code is a Hashed Message Authentication Code (HMAC) that is generated from the install command using a cryptographic hash function and a shared secret between the user device and the server.

16. The computer-implemented method of claim 13, wherein the encrypted hash of the latest version of the installer package is to be decrypted by the device agent application using a public key of asymmetric encryption that corresponds to the private key, the public key being stored in the user device.

17. The computer-implemented method of claim 16, wherein the receiving includes receiving the indication for an install of the remote support client application from the latest version in response to a hash of the latest version generated by the device agent application matching a decrypted hash that is decrypted from the encrypted hash via the public key.

18. The computer-implemented method of claim 13, further comprising sending an execution command that causes the remote support client application to initiate the remote support session with the remote support application, the execution command being sent based on a user initiated execution request from a customer care terminal of a customer service representative, an execution request initiated for a customer support call that is detected via an interactive voice response (IVR) function, or a troubleshooting engine initiated execution request from the troubleshooting engine that seeks to resolve a device issue via remote intervention.

19. A system, comprising:
   one or more processors; and
   memory including a plurality of computer-executable components that are executable by the one or more processors to perform a plurality of actions, the plurality of actions comprising:
      receiving a request for a remote support eligibility status from a device agent application on a user device, the device agent application to use a remote support client application to initiate a remote support session with a remote support application on a remote support server, the remote support session to provide a computing terminal with remote support access to the user device, wherein the request for the remote support eligibility status includes a hash of the installer package preloaded on the user device;
      comparing the hash to a new hash of a latest version of the installer package for the remote support client application;
      sending the latest version of the installer package for the remote support client application along with a private key encrypted hash of the latest version of the installer package to the user device in response to the hash and the new hash being different;
      sending an indication that the install package on the user device is up-to-date to the device agent application on the user device in response to the hash and the new hash being identical;
         determining based on at least one of a device management database or a user account database that the user device qualifies for remote support in response to the request for the remote support eligibility status, the device management database including a list of user devices for which remote support client application are available, and the user account database including service plan details and a payment history of a user that affects remote support eligibility for the user device;
      sending an install command and a message authentication code to the user device following the user device qualifying for the remote support, the install command triggers an installation of the remote support client application on the user device from the installer package for the remote support client application, wherein the installer package comprises at least one of: a setup file, a library file, or an installation utility for installing the remote support client application on the user device;
      receiving an indication that the remote support client application is installed onto the user device from the installer package, the remote support client application being installed following the device agent application validating the install command via the message authentication code;
      receiving an electronic authorization from the user device, prior to the user device executing the remote support client application, to start the remote support session; and
      sending an authorization confirmation message to the user device, wherein the user device initiates execution of the remote support client application to start the remote support session in response to the authorization confirmation message.

20. The system of claim 19, wherein the sending the install command includes sending the install command in response to a user initiated installation request from a customer care terminal of a customer service representative, an installation request initiated for a customer support call that is detected via an interactive voice response (IVR) function, or a troubleshooting engine initiated installation request from the troubleshooting engine that seeks to resolve a device issue via remote intervention.

21. The one or more non-transitory computer-readable media of claim 1, wherein sending the install command comprises sending the install command to the user device as a Short Messaging Service (SMS) message via the wireless carrier network.

* * * * *